FIG. 1

INVENTORS D. A. ALSBERG
D. R. HAGNER
E. E. MULLER

FIG. 5A
ADDRESS DECODER NO. 1

FIG. 5B
ADDRESS DECODER NO. 2

FIG. 5C
ADDRESS DECODER NO. 3

INVENTORS
D.A. ALSBERG
D.R. HAGNER
E.E. MULLER

BY
ATTORNEY

Feb. 2, 1971  D. A. ALSBERG ETAL  3,560,971
GUIDANCE CONTROL AND TRAJECTORY MEASURING SYSTEM
Filed Aug. 28, 1961  9 Sheets-Sheet 6

INVENTORS D. A. ALSBERG
D. R. HAGNER
E. E. MULLER
BY
ATTORNEY

3,560,971
GUIDANCE CONTROL AND TRAJECTORY
MEASURING SYSTEM
Dietrich A. Alsberg and Donald R. Hagner, Berkeley
Heights, and Erwin E. Muller, Towaco, N.J., assignors
to Bell Telephone Laboratories, Incorporated, New
York, N.Y., a corporation of New York
Filed Aug. 28, 1961, Ser. No. 136,143
Int. Cl. G01s 9/02; F41g 9/00
U.S. Cl. 343—7                                    7 Claims This invention relates to a guidance and trajectory measuring system for long-range ballistic missiles, space vehicles and the like. More particularly, this invention relates to a guidance system which simultaneously utilizes both pulse and one-way Doppler radar facilities to obtain two independent values of missile velocity in order to derive a resultant velocity that is as precise and timely as the Doppler data, but which has been corrected for the oscillator drifts normally confounding Doppler measurements. Still more particularly, the present invention relates to a guidance system which utilizes a plurality of non-coherently connected radar observing sites, some of which are located down range from the blast-off point, in order to obtain more precise orthogonal information regarding the velocity and position of the missile during the powered portions of its flight. The velocity and position data obtained from the various radar sites are fed to a computer situated at a central location, usually the blast-off point, which weighs the information received from each site in accordance with the present position of the missile to determine its current velocity and position.

In current practice, long-range missiles and the like are powered only for a time sufficient to enable them to attain a desired combination of velocity and position. Once these are attained, the rocket engines are turned off and the missile completes the rest of the flight by virtue of its momentum and the gravitational forces to which it is subjected. This type of flight imposes stringent requirements on the guidance system since missile velocity and position must be known to a high degree of accuracy immediately prior to the time the rocket power is cut off if a minimum error in the target impact area is desired. Small errors in the measurement of any of these variables at the time of power cut-off can result in an appreciable miss for a flight of 5,000 miles. For example, an error in velocity, rangewise, of one foot per second, at the time of power cut-off, can manifest itself in a miss of approximately one mile for a 5,000 mile range while an error in cross velocity of six feet per second can cause a miss of approximately one mile at this range.

The guidance system, in order to insure the necessary precision in velocity at the time of power cut-off, in general, is operative to correct velocity and position errors in the missile from the moment of its blast-off, or shortly thereafter, until the time of motor cut-off since during this entire period the missile is subjected to a number of forces which vary in magnitude and tend to veer it from its proper course. These forces include uneven thrusts in the magnitude and direction of the rocket motors, variations in air pressure as the missile travels away from the earth's surface, et cetera.

Accordingly, an object of the pressure invention is to increase the accuracy of long-range missile guidance systems.

A critical factor in the successful guidance of a long-range missile is the accurate determination of its velocity and position during the powered portion of its flight. If these parameters can be accurately determined, control information can be issued to the missile to compensate for any deviation from the trajectory required for it to reach its target. However, the accurate determination of velocity and position is not as easy as might at first appear since substantial errors are normally present in the methods and equipment heretofore used to provide this information.

Accordingly, a second object of the invention is to improve the accuracy of the missile velocity and position determinations.

The obtaining of accurate instantaneous missile velocity and position data depends to a large extent on the accuracies of the information collecting and sensing instrumentalities utilized, such as radars, as well as on the manner in which the data is processed and utilized once it is obtained. There is a limit on the guidance accuracy that can be achieved even if it were possible to eliminate all sources of equipment error. The factors contributing to this limit in accuracy include man's uncertainty as to the specific value of, as well as rapid fluctuations in, the propogation constant, uncertainty as to the exact value of the earth's gravitational pull and uncertainty as to the time at any given instant. However, a system limited in accuracy only by these uncertainties would represent a significant improvement over those currently available.

The provision of a guidance system approaching such accuracy is dependent upon the obtaining of more accurate instantaneous missile velocity and position data than has been heretofore available. It is more difficult to obtain accurate instantaneous velocity data than it is to obtain accurate position data due to noise and other sources of error in the instrumentalities utilized in the derivation of the velocity data.

To date, velocity is usually obtained either by differentiating successive pulse radar range determinations or by means of Doppler radar. The velocity data obtained from differentiating pulse radar range determinations is quite accurate on a long-term basis. However, it is not reliable on a short-term basis because of atmospheric noise, radar pulse jitter and other errors inherent to the differentiating of data separated by a short time span. The velocity data obtained from observation of the Doppler shift of a signal transmitted from a moving body is quite accurate provided that the Doppler reference oscillators are precisely fixed to a specified frequency. The oscillators in present day Doppler trackers, such as used for satellites, are sufficiently stable for the needs of satellite orbital determination. However, when it is noted that, in the case of ballistic missile guidance, an oscillator drift of only 10 cycles per second out of 10,000,000,000 cycles per second manifests itself in an impact error of one mile for a 5,000 mile flight, it may then be appreciated that oscillators having frequency stabilities in the vicinity of one part in $10^{11}$ are required. Oscillators having this stability and which are suitable for incorporation into the guidance portion of missiles are not available at the present time.

Various schemes have been proposed heretofore in order to facilitate the obtaining of more accurate velocity information from pulse radars. For example, it has been proposed that the output data of such systems be smoothed to average out the random errors in the information collecting instrumentalities. However, smoothing by itself cannot provide instantaneous velocity data of the necessary accuracy for the present purposes since, although random errors in input data are minimized in proportion to the square root of the duration of the smoothing interval, the resultant output data becomes less indicative of present (instantaneous) velocity as the smoothing interval is increased. In other words, ten second smoothing may provide highly accurate data on a long-term basis. However, this data, although accurate, would be quite useless if the system in which the data is used requires that instantaneous velocity be computed on the basis of information no older than ½ second.

Accordingly, a still further object of the invention is to improve the processing of the information supplied by the sensing instrumentalities used in a guidance system.

The accuracy of the missile position determination is dependent upon the accuracy of the radar range information and the equipment used in determining the angular position of the antenna.

The radar range information is quite accurate for most purposes, since the inaccuracies caused by noise and other such factors can usually be suitably minimized by smoothing. This is in contrast to the velocity determining operation whereby smoothing alone cannot provide instantaneous velocity data having the necessary accuracy. The position data, unlike velocity, is sufficiently accurate after smoothing since it is not as sensitive to factors which can cause instantaneous deviations as is velocity data. Thus, the instantaneous position information may be accurately determined by projecting the long-term smoothed previously obtained position data forward to the present time.

The angular information obtained from a single monopulse tracking radar antenna is sufficiently accurate at short ranges such as those associated with the missile during the first few seconds following blast-off. However, the angular differences in the radar antenna movement for equal differences in missile position become smaller and smaller as the missile proceeds in its flight and as a consequence, angular errors become more significant. Thus, the travel of the missile for the final few seconds before motor cut-off may be represented by only an infinitesimally small angular movement of the tracking antenna such as, for example, a few hundredths of an angular mil. Angular differences of this magnitude are extremely difficult to measure by the equipment presently available and as a consequence, considerable error can often be associated with such measurements as the missile increases its distance from the blast-off point. This is most unfortunate since the accurate determination of missile position and velocity just prior to motor shut-off is perhaps the most important time insofar as the success of the flight is concerned and, it is at this time that errors in these parameters manifest themselves by significant misses in the target.

Attempts have been made to increase the accuracy of the angular measuring equipment. However, the resultant equipment has been of such complexity that it becomes unsuitable for use with equipment which must undergo rugged field usage. Other attempts to minimize the inaccuracies associated with the angular measures have resulted in the use of a plurality of radar observation points all of which simultaneously track the missile. Although such expedients minimize angular errors to some extent, they are not altogether satisfactory since they require coherence between all radars tracking the missile together with the interconnection of all such radar observation points by a high quality communication channel over which the radar data is transmitted.

Accordingly, it is a further object of the invention to provide a guidance system in which the accuracy of the missile position determining apparatus is significantly improved.

In acordance with the present invention a missile guidance system is provided which eliminates many of the sources of velocity and position determining errors heretofore associated with guidance systems and therefore, is able to guide missiles with an accuracy approaching the limits imposed by our imperfect knowledge of physical constants as already mentioned. The disclosed system utilizes both pulse and Doppler radar equipment in the ground-based tracking facilities as well as in the missile. The ground-based pulse radar is utilized to issue the necessary command orders to the missile such as, for example, roll, pitch, yaw, main motor cut-off, vernier motor cut-off, et cetera. These commands are received by the pulse radar receiver in the missile, translated into the necessary command signals, and applied to the guidance equipment to effect the functions represented by the commands. The missile equipment also includes a radar pulse transmitter which responds to command signals received from the ground equipment and, in reply transmits responding pulses back to the ground equipment. The ground radar utilizes these responding pulses in accordance with conventional techniques to supply missile range, azimuth and elevation data. This information is used to orient the tracking antenna as well as in the manner described hereinafter for supplying missile velocity and position information.

Also included in the equipment aboard the missile is a Doppler frequency source which transmits a fixed frequency signal to the tracking radar which, in accordance with well known techniques, ascertains the velocity of the missile from the frequency of the received Doppler signal. The Dopper equipment at the tracking radar includes only a receiver, a reference oscillator having the same frequency as that in the missile, which by preference and not by necessity, has greater precision than the one in the missile, together with the necessary heterodyning equipment for determining the missile velocity from the difference frequency between the Doppler signal received from the missile and the reference oscillator in the tracker. This arrangement is far simpler, and hence more reliable, than present day Doppler trackers since the present invention requires only a Doppler receiver, rather than both a Doppler transmitter and receiver, in the ground tracker.

The pulst radar range determinations at the ground tracker are first differentiated to obtain missile velocity information. This velocity information is inaccurate in its raw state since it contains noise inherent to the differentiation process together with other sources of error such as, for example, radar pulse jitter. This data is then smoothed in a typical case for 5 seconds to obtain a velocity that is highly accurate on a long-term basis since the 5 second smoothing effectively removes the noise and other sources of error.

The velocity information supplied by the ground-based Doppler radar is also inaccurate in its raw form since it includes atmospheric noise and other sources of error such as, for example, oscillator drift in the missile. This information is accordingly similarly smoothed for 5 seconds to provide long-term velocity information which is quite accurate except for oscillator drift in the missile. The 5 second smoothed pulse radar velocity is more accurate than the 5 second smoothed Doppler radar velocity since the pulse radar data is not subject to the Doppler oscillator drifts. Other than this, the two velocities are of essentially equal accuracy and, since they both represent the velocity of the same body, any differences therebetween are, of necessity, caused by frequency drift in the Doppler oscillators. Knowing this to be true, the amount of oscillator drift at any instant during the 5 second smoothing interval may be extrapolated from the difference in indicated velocity between the two sets of smoothed data since this velocity difference must be precisely indicative of the frequency drifts of the Doppler oscillators.

The raw velocity information from the Doppler radar is also smoothed for ½ second to obtain velocity data that is highly accurate on a short-term basis except for noise and possible short-term oscillator frequency drift in the missile. The rate at which the oscillator drifts from its normal frequency is known to be slow and may, therefore, be quite accurately determined at any time from the difference in indicated velocities between the two sets of 5 second smoothed velocity data. This difference is then algebraically subtracted from the ½ second Doppler smoothed data to obtain a velocity of extreme precision. However, since this velocity is based on information which is ¼ second old (the average age of information in a ½ second smoothing filter), it is fed to a predictor which updates it so that it may be used to provide an indication of the present instantaneous missile velocity.

The position data for the missile is determined in accordance with one embodiment of the invention in the conventional manner from the pulse radar range data and the angle of the tracking antenna.

The missile velocity and position data are continuously derived in the manner described and compared with that of a previously computed trajectory necessary for the missile to reach the target. Any deviation from this trajectory is detected and results in the issuance of the necessary commands from the tracking radar to the missile to correct the trajectory deviations and restore the missile to the desired trajectory. These data determining and guidance functions are accomplished by a single ground-based radar which preferably may be situated at the missile blast-off point.

Errors in the missile velocity and position data provided by the foregoing described arrangement are mainly due to the angle measuring equipment associated with the ground radar tracking antenna. When still greater target precision is desired, these angular errors can, for all practical purposes, be eliminated by providing two additional radar observation sites sufficiently downrange so that the measured data for the missile in the seconds preceding power cut-off more nearly approaches a set of orthogonal data. The downrange radar sites need not be synchronized with each other or with the radar at the blast-off point. The radar equipment at each site independently computes missile velocity and position information and then transmits it to a computer situated at the blast-off point. This computer receives the missile velocity and position data from each site, weighs the information from each site in accordance with the present position of the missile and, from the weighed information, performs the aforementioned 5 second and ½ second smoothing operations to compute the desired accurate missile velocity and position data.

The foregoing arrangement is advantageous in that the use of the downrange trackers results in the derivation of more accurate trajectory data than is possible with the use of only a single tracker. However, each tracker contains the necessary computation and guidance equipment so that it alone can control the missile in the event that the other trackers become inoperative.

A feature of the invention is the provision of a guidance system in which missile position data is obtained from pulse radar equipment while missile velocity data is simultaneously obtained from both pulse and Doppler radar equipments.

A futher feature of the invention is the provision of a guidance system which, after obtaining missile velocity information simultaneously from both pulse and Doppler radar equipment, smooths both the pulse and Doppler radar velocity data for 5 seconds and the Doppler radar velocity for ½ second in order to obtain highly accurate velocity data.

A further feature of the invention is the provision of a guidance system which utilizes a plurality of radar observation sites connected by a non-coherent communication channel to provide missile velocity and position data.

A further feature of the invention is the provision of a guidance system having a plurality of non-coherently connected radar observation sites each of which simultaneously utilizes both pulse and Doppler radar equipment to provide accurate missile velocity and position data.

A further feature of the invention is the provision of a missile guidance system which utilizes a plurality of non-coherently connected radar observation sites each of which derives missile velocity and position data and transmits the derived information to a computer at a central location which weighs the information from each site in accordance with the instantaneous position of the missile and then computes accurate missile velocity and position data.

A further feature of the invention is the provision of a missile guidance system which receives guidance orders from a plurality of tracking stations, which identifies the station transmitting each received order, and which then responds only to the orders from a preferred one of the stations currently transmitting orders.

These and other objects and features of the invention may be more readily understood when taken in conjunction with the following specification and drawings in which.

Figure 1:
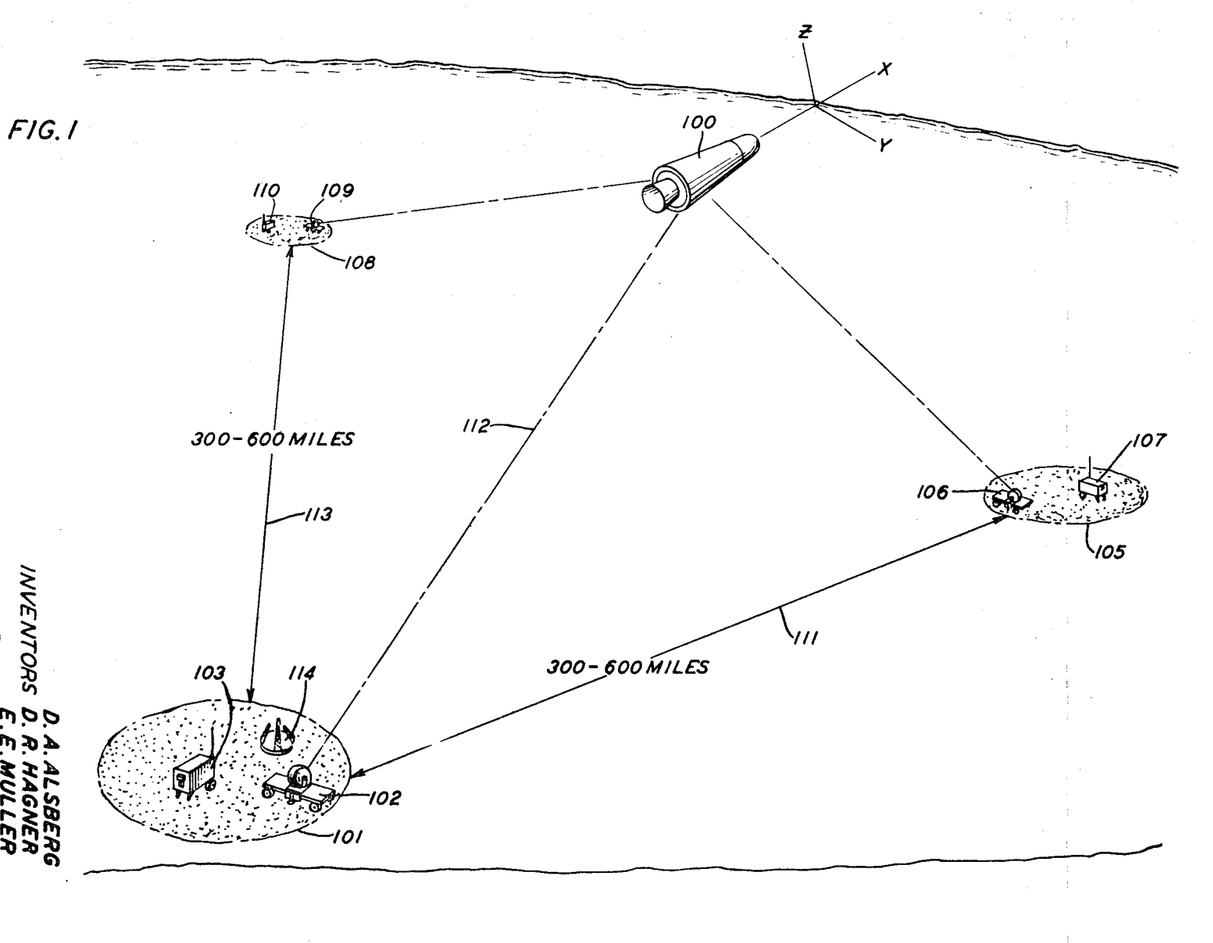
FIG. 1 discloses the geographical relationship between the various elements of the system.

Referring now to FIG. 1, it may be seen that it discloses a missile 100 in flight after having been fired from launching area 101. The launching area equipment 101 includes a rocket launcher 114, radar tracking antenna equipment 102, and guidance and computation equipment 103. Elements 102 and 103 combined are operative in the manner disclosed herein to track the missile during the powered portion of its flight, ascertain the instantaneous missile velocity and position, detect any deviations of the missile from the trajectory necessary for it to reach the target, and finally, issue the necessary commands to return the missile to its desired trajectory.

Elements 102 and 103 function to provide velocity and position data which is relatively error free except for errors associated with the tracking antenna angular measuring equipment. As described, these errors become more significant as the missile proceeds in its flight since a given angular difference represents larger position errors. The power cut-off of most long-range missiles at the present time occurs when the missile is approximately 300–600 surface miles from the launching area. When it is noted that a crosswise missile velocity error of 6 feet per second at the time of power cut-off manifests itself in a target miss of approximately 1 mile, it may then be appreciated that it is difficult for the radar at the launching area to detect small trajectory errors at this crucial portion of the flight since such trajectory errors are represented by extremely small angular differences at the launching site tracking radar.

If it is desired to minimize such errors, down-range tracking stations may be provided. FIG. 1 discloses two such stations, one of which is station 105 having a radar tracking antenna 106 and a guidance computer 107, while the other is tracking site 108 which has a radar tracking antenna 109 and a guidance computer 110. Sites 105 and 108 are situated sufficiently downrange so that during the crucial portion of the flight immediately preceding power cut-off, they are able to track the missile and derive independent values for missile velocity and position by means of data that are more nearly orthogonal. Each of stations 105 and 108 transmits its computed velocity and position data back to the computer 103 at the launching area 101 which, after receiving the independently computed velocities and positions from each of the three tracking sites, weighs the information from each site time-wise in accordance with the position of the missile, smooths the weighed information in the manner described, and derives a resultant instantaneous velocity and position which is of extreme accuracy and is sufficient to guide the missile to the target with a predicted impact error of better than ¼ mile at a 5,000 mile range.

Ideally, both tracking stations 105 and 108 should be positioned downrange a distance equal to that at which the rocket power is cut off. Also ideally, one tracking station should be placed directly underneath the missile at the power cut-off point in order that any altitude deviations in the trajectory will be detected by the radar's range-determining equipment rather than by its angle-measuring equipment. Also, the other tracker should be located an equal distance downrange but should be displaced sufficiently to the side of the power cut-off point so that any lateral errors in the trajectory will similarly be detected by range-determining rather than the angle-measuring equipment. Although such an arrangement is ideal insofar as theoretical considerations are concerned, it is not necessary from a practical standpoint. In the first place, such an arrangement of tracking stations would only be exact for a single launcher-target alignment, and secondly, sufficient accuracy may be obtained by merely positioning the downrange tracking stations in the general manner indicated on FIG. 1. When so arranged, trajectory errors are detected by the simultaneous utilization of the range-determining equipment of the three radars. This permits missile position and velocity data to be derived that is far more accurate than that which can be obtained from the use of only the launching site tracker.

Figure 2:
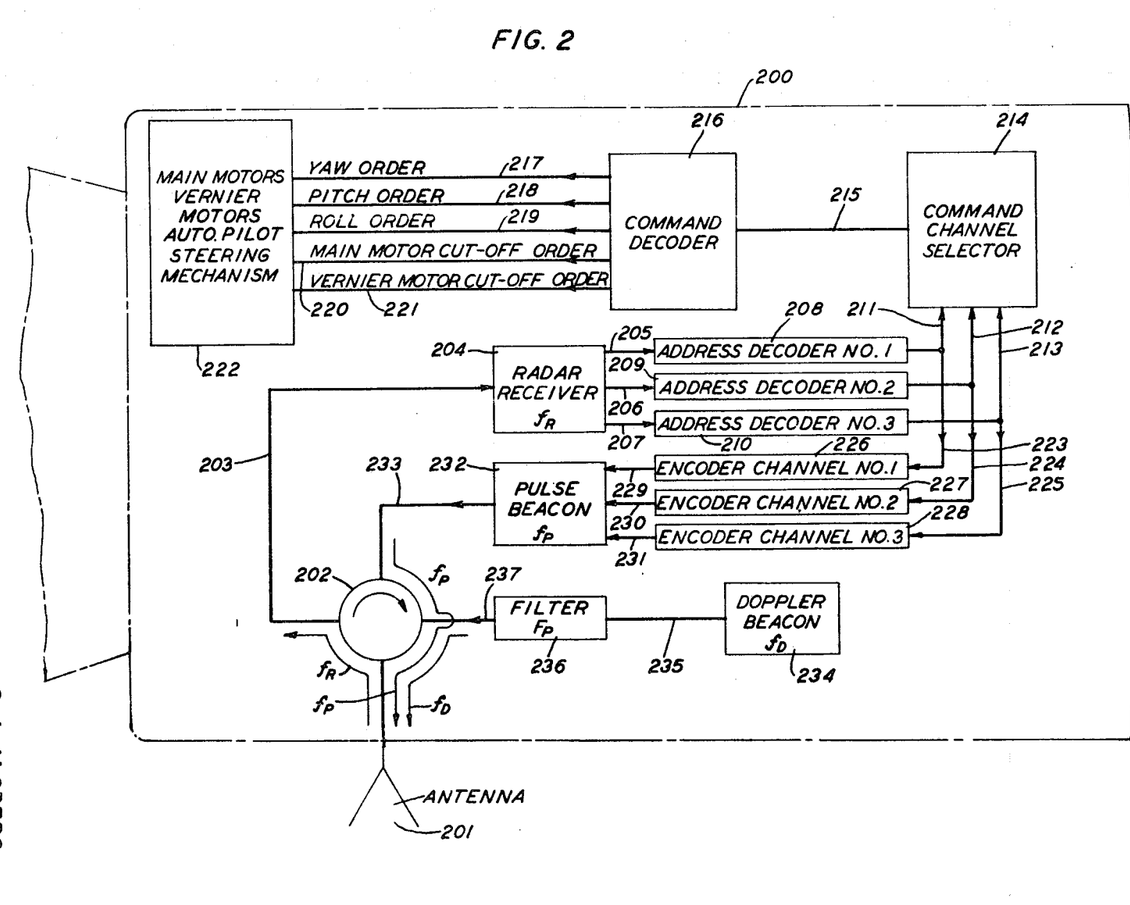
FIG. 2 discloses that portion of the guidance system located in the missile.

The portion of the guidance equipment located in the missile is shown in FIG. 2 and is represented generally by the designation 200. Guidance equipment 200 includes an antenna 201 which receives signals from and transmits signals to the ground-based tracking radars. The signals received by antenna 201 are applied to the microwave circulator 202, out over waveguide 203 to the input of the radar receiver 204. The receiver 204 detects and amplifies the received signals and applies them over its output conductors 205, 206, and 207 to address decoders 208, 209, and 210, respectively. These decoders are disclosed in more detail in FIG. 5.

The function of the address decoders is to enable the missile guidance equipment to determine the identity of the tracking radar which transmitted each signal received at antenna 201. This identification is necessary since, inasmuch as a plurality of radars may be employed to track a single missile and, as a consequence thereof, to transmit command pulse signals to the missile, it is necessary that the missile equipment identify the tracking station associated with each received command in order that it may, in turn, reply with a responding signal unique to the interrogating tracker. This identification may be accomplished in one of two ways. Specifically, it may be accomplished on a frequency discrimination basis wherein each tracking station has an interrogation pulse of different frequency so that the identification of the tracking station may be accomplished in the missile by frequency selective equipment. Alternatively, this identification may be accomplished by the means of pulse coding wherein each tracking station is distinguishable by the pulse code used in transmitting its command signals.

The presently disclosed system accomplishes this identification operation by the pulse code arrangement. Specifically, in accordance with the present invention, the identification of each ground station is accomplished by having each command signal comprise a pulse series in which the pulse spacing is different for each tracking station. A command signal may represent an interrogation order which causes the missile equipment to generate a responding pulse series or, it may represent an order for the guidance control equipment to alter the course of the missile. In short, each command sent to the missile comprises a series of coded pulses with the spacing between certain pulses signifying the identity of the tracker transmitting the command and with the spacing between others of the pulses signifying the nature of the command.

The pulses comprising each command are applied to the input of each address decoder 208, 209 and 210. Each decoder is individual to a particular tracking station. Address decoder 208 may, for example, be associated with the tracker at the launching area while decoders 209 and 210 may be associated with the downrange trackers. Each decoder is operative to detect the spacing between the successive pulses comprising a command and to permit a command to pass to its output only in the event that the pulse spacing is that for its associated tracking station. Thus, assuming that the tracker at the launching point issues a command, the pulses comprising the command are applied to the input of all three address decoders. Decoders 209 and 210 block the passage of this command since its pulse spacing is not that of the trackers with which these two decoders are associated. However, the pulse spacing for this command is such that decoder 208 detects it to be that of its associated tracking station and therefore passes the command over its output conductor 211 to the command channel selector 214. The outputs of decoders 209 and 210 are also connected over conductors 212 and 213, respectively, to the input of the command channel selector. However, since the present command is assumed to have been issued by the tracker associated with decoder 208, only it is operative at this time to pass the command to the command channel selector.

Figure 5:
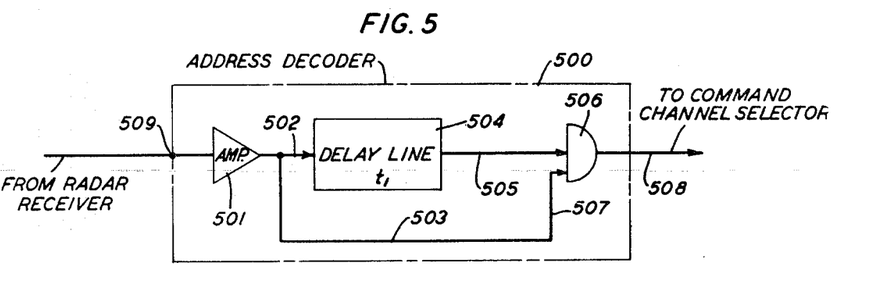
FIGS. 5 and 5A, 5B, and 5C disclose the details of the address decoders 208, 209 and 210 in FIG. 2.

The details of the address decoders are shown on FIG. 5. As shown, each address decoder 500 comprises an amplifier 501, a delay line 504 and an AND gate 506. The output of the radar receiver 204 is applied to the address decoder 500 at the input of its amplifier 501. Basically, the function of this entire circuit is to cause a single output pulse to appear on conductor 508 each time a pair of pulses having a specified interpulse spacing are applied to the input of amplifier 501.

Figure 5A:
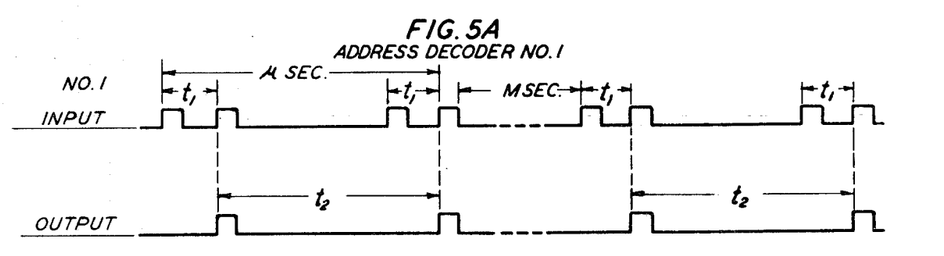

FIG. 5A shows the time relationship of the input pulses for a typical command as might be applied to the input terminal 509 of address decoder 1. As shown in the top line of FIG. 5A, a single command comprises four pulses, the first two of which are separated from each other by a time $t_1$, the second and third of which are separated from each other by a period of time measured in microseconds, and the last two of which are also separated from each other by time $t_1$. The second and fourth are also separated from each other by a time designated $t_2$. As explained hereinafter, the pulse spacing $t_1$ represents the address code of the tracker transmitting the command while the pulse spacing $t_2$ signifies the nature of the command.

The first pulse of each command is received and amplified by amplifier 501 and applied to the input 502 of the delay line 504. It is also applied over conductor 503 to the input 507 of AND gate 506. The appearance of this pulse at input 507 effects no circuit action because the AND gate is not enabled at its input 505 from the delay line at this time. The pulse applied to the input of the delay line proceeds to travel therethrough and reaches the output of the delay line and the input 505 of gate 506 after a time $t_1$. Also, at a time $t_1$ after the reception of the first pulse, the amplifier 501 receives the second pulse of the command as shown on the top line of FIG. 5A. This pulse is similarly applied both to the input of the delay line as well as to the input 507 of the AND gate. The AND gate is enabled at this time since the second pulse is applied to its input 507 while the delay line is simultaneously applying the delayed first pulse of the command to the other input 505 of the gate. As a consequence the AND gate opens and conducts for the duration of time that both pulses are coincidently applied to its input. Assuming that the time delay of the delay line 504 is precisely equal to the interpulse spacing of the first and second pulses, it may then be said that the AND gate effectively passes only the second of the first two pulses applied to the input terminal 509.

The second pulse applied to the input of the delay line is similarly delayed by a time $t_1$ and then applied to the input 505 of the AND gate. However, it effects no circuit action at this time since no signal is currently applied to input 507 of the AND gate. The next two of the four pulses in each command, as shown by the third and fourth pulses on the top line of FIG. 5A, are similarly separated from one another by a time $t_1$ and thus, in a manner already described, only the fourth pulse passes through the AND gate.

Each pulse transmitted through the AND gate as shown in the lower line of FIG. 5A, is applied over output conductor 508 to the input of the command channel selector 214.

Each address decoder is associated with a different tracking station and each decoder is equipped with a delay line 504 which differs from that in each other address decoder by the amount of time it delays each incoming pulse. This is shown on FIGS. 5A, 5B and 5C where the time delay for the delay line of decoder 1 is shown as $t_1$, where the time delay of decoder 2 is greater than that of decoder 1 and shown as $t_3$ and where the time delay of the delay line for decoder 3 is shorter than either other decoder and is shown as $t_4$.

Figure 5B:
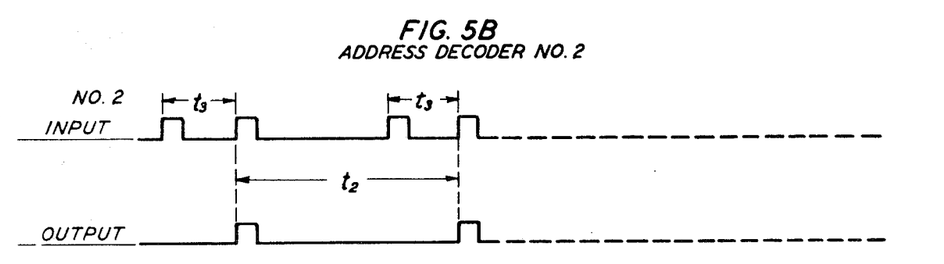
Figure 5C:
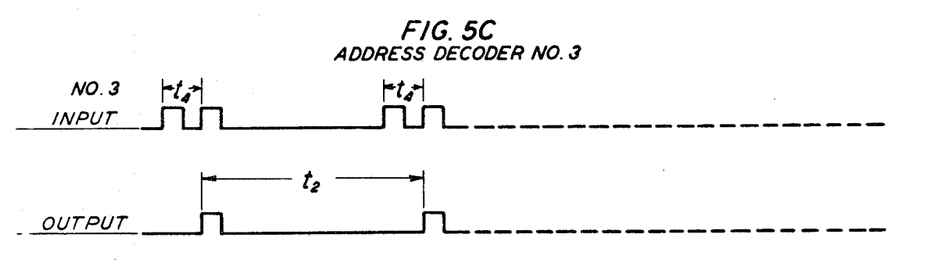

The top line in each of FIGS. 5A, 5B and 5C represents the pulse series transmitted from each tracking station for the same command. However, the spacing between the first and second and the third and fourth pulses permits the missile to identify the tracking station transmitting the pulses. The spacing between the second and fourth pulses in each series signifies the nature of the command. Accordingly, it may be seen from a study of the second line of each of FIGS. 5A, 5B and 5C that the two pulses shown thereon represent the same command since the pulse spacing therebetween is identical and is represented by the time $t_2$.

The time between successive commands is in the order of milliseconds as indicated by the dotted lines of FIGS. 5A, 5B and 5C and therefore, there is no confusion insofar as the missile equipment is concerned between the last pulse of one command and the first pulse of the following command.

The command channel selector 214 may be arranged to respond in a number of alternative manners. For example it may be arranged to respond to commands from any of the tracking radars via their address decoders, or it may be arranged to respond to only the commands from a single tracker via its address decoder, or alternatively, it may be arranged to respond initially to the command from only a single tracker, but provision may be made whereby in an emergency the other trackers can issue commands to override this initial preference and cause the command channel selector to respond to their commands during such emergency periods. Thus it might be advantageous in many cases to adjust the command selector so that it will respond only to commands issued from the tracking radar at the launching station but, in the event of an emergency such as the obliteration of this tracker, the downrange trackers can tke over the guidance of the missile. In this case, the command channel selector 214 is set to respond in all cases to the commands from the launching site tracker applied to its input via decoder 208 but, in cases of emergency, it can respond to commands from the downrange trackers as applied thereto via decoders 209 and 210.

Figure 6:
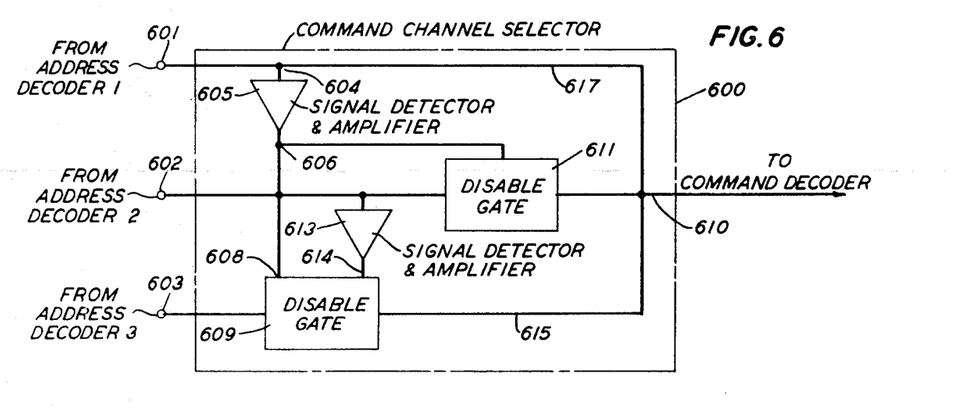
FIG. 6 discloses the details of the command channel selector 214 in FIG. 2.

The details of the command channel selector 214 are shown on FIG. 6. The outputs of address decoders 1, 2 and 3, as shown on FIG. 2, are applied to input terminals 601, 602 and 603, respectively. The equipment within the rectangle 600 comprises a preference arrangement whereby the signals applied to input terminal 601 are always applied to the output terminal 610. The signals applied to terminal 602 are applied to the output terminal 610 only in the event that no signals are or have been received by input terminal 601 for a predetermined period. Similarly, signals on input terminal 603 pass to the output terminal 610 only in the event that no signals are or have appeared on either of the other input terminals for a predetermined period of time.

This preference arrangement is accomplished by means of the signal detector and amplifier 605, disable gate 611, signal detector and amplifier 613, and the disable gate 609. A signal on input terminal 601 passes to output terminal 610 and energizes amplifier 605 which disables gates 611 and 609 and thereby disconnects input terminals 602 and 603 from the output terminal 610. This prevents signals on these two terminals from passing to output terminal 610 as long as the gates are disabled. Similarly, in the absence of a signal on terminal 601, a signal on input terminal 602 passes to output terminal 610. The same signal is also amplified by amplifier 613 and applied to gate 609 thereby disabling it and disconnecting terminal 603 together with any signals thereon from output terminal 610.

The command channel selector thus comprises a preference circuit which enables the missile to respond to commands from tracker No. 1 which advantageously may be located at the blast-off point, as long as this tracker is operative and to disregard commands from the other two trackers. However, in the event of the loss of tracker No. 1, the missile can receive and obey commands from tracker No. 2 and, in the event that it is lost, from tracker No. 3.

The command channel selector passes the commands of the tracker to which it is adjusted to respond to the input of the command decoder 216 over conductor 215. After passing through the address decoder, each command is represented by a pair of pulses the spacing between which represents the nature of the command. The common decoder may comprise a plurality of circuits similar to the address decoder of FIG. 5 so that each different command will manifest itself by a signal passing through only its associated portion of the command decoder. The command decoder translates the coded commands into the necessary command signals and applies them over control conductors 217 through 221 to the guidance control equipment of the missile represented generally as 222.

The outputs of address decoders 208, 209 and 210 are also applied over conductors 223, 224 and 225 to the input of encoders 226, 227 and 228 respectively. Each encoder responds to each command from its associated address decoder and, in response thereto, generates a responding pulse series whose pulse spacing is unique to the associated tracking station and to which only this tracker can respond.

Figure 7:
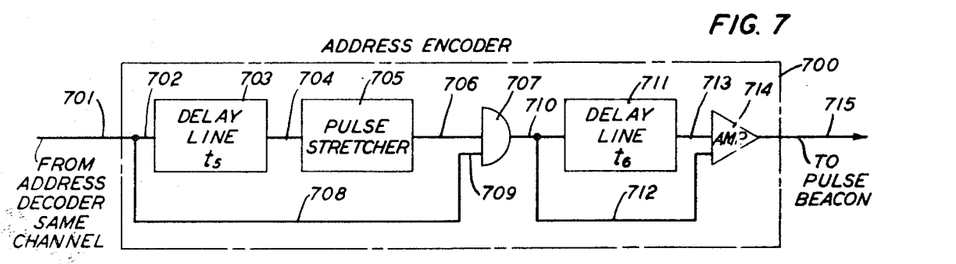
FIGS. 7 and 7A disclose the circuit details and the waveforms of the address encoders 226, 227 and 228 of FIG. 2.

The details of encoders 226, 227 and 228 are shown in FIG. 7. The purpose of each encoder is to generate a responding pulse series in response to the reception of every command signal from its associated tracker.

Figure 7A:
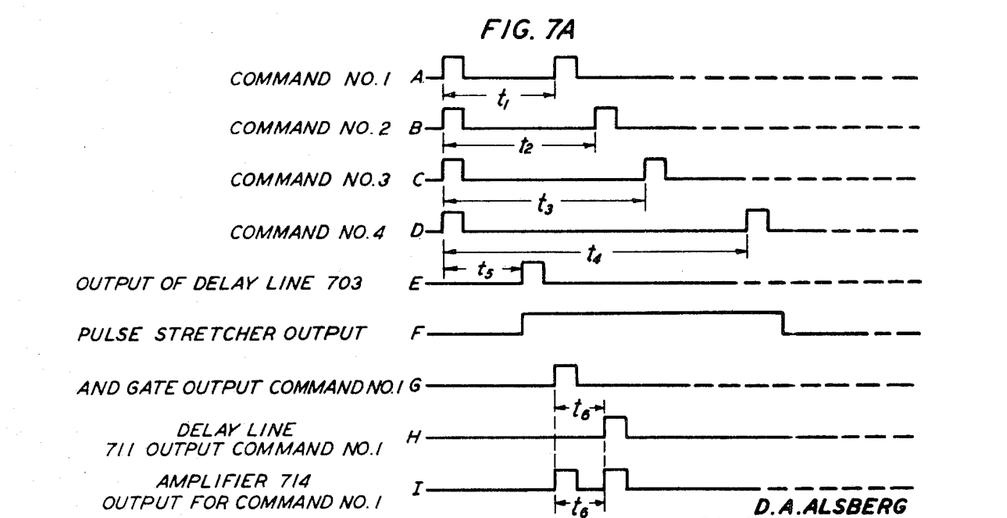

Each tracker is capable of transmitting many different types of commands to the missile. Each command appearing at the input of the encoders consists of two pulses and each command differs from the others only in its interpulse spacing. This interpulse spacing varies considerably in accordance with the nature of the command. This is shown on lines A, B, C and D of FIG. 7A where a typical pulse spacing for four different commands is shown. The encoder, in order to perform its intended function, must recognize the reception of each command regardless of its interpulse spacing and, in response thereto, must generate a responding signal comprising a pair of pulses whose interpulse spacing is individual to the tracking radar transmitting the command. The first pulse of each command, as shown in lines A through D, is applied to the input of a delay line 703 and is simultaneously applied to the input 709 of an AND gate 707. The pulse applied to the AND gate at this time effects no circuit operation since the other input of the AND gate is not currently energized. The pulse applied to the input of the delay line is delayed by the time $t_5$ and then applied to the input of the pulse stretcher 705. The output of the delay line 703 is shown on line E of FIG. 7A where an output pulse is shown delayed by the time $t_5$ from the reception of the first pulse applied to the input of the delay line for any command as shown on lines A through D. The pulse stretcher receives at its input the output pulse from the delay line and, in response thereto, generates a pulse having a long duration as shown in line F of FIG. 7A. Generally speaking, the output pulse of the pulse stretcher is wide enough so that it applies an input pulse to the AND gate for a period of time long enough to enable the second pulse representing any possible command to be applied to input 709 of the AND gate. Thus. referring to the pulse on line F of FIG. 7A, it may be seen that its width includes the time at which the second pulse is received for any of the commands represented in lines A–D. By this expedient, a single pulse as shown in line G is produced at the output of the AND gate for each and every command received by the encoder from its associated address decoder.

Each output pulse from the AND gate is applied directly to one input of amplifier 714 and is also applied through delay line 711 to another input of the amplifier 714. The delay line 711 delays each pulse for a time $t_6$ and then applies it to the input of amplifier 714. The output of the delay line is shown on line H where the spacing between its input and output pulses is shown as time $t_6$. By this expedient, as shown on line I of FIG. 7A, amplifier 714 receives two pulses separated by the time $t_6$ response of each pulse at the output of AND gate 707. The delay line 711 is adjusted to have an appropriate delay period so that the resultant interpulse spacing of the pulse pair applied to amplifier 714 corresponds to the address code of the tracking radar initiating the command.

The output pulses from the encoders 226–228 are applied over conductors 229, 230 and 231 to the input of the pulse beacon which is modulated in accordance with the pulse train generated by each encoder. Thus, assuming that an interrogation command from the launching tracker is passed by address decoder 208 to the input of encoder 226, this encoder in turn generates a responding pulse train whose pulse spacing is unique to the launching tracker, applies these pulses to the beacon transmitter 232 which, in response thereto, generates a pair of high power pulses which are applied over output conductor 233, through the microwave circulator 202, to antenna 201. The radars at each tracking station receive all such series of pulses transmitted by beacon 232. However, each tracker responds only to the beacon pulses encoded by its associated encoder. This may be accomplished by providing each radar receiver with equipment similar to that in the address decoder so that the received pulse pairs having an interpulse spacing other than that for which the tracker is designed to repsond will be rejected.

Also included in the missile equipment is a Doppler beacon transmitter 234 which generates a signal at a constant frequency and applies it over conductor 235 through filter 236, conductor 237, through the microwave circulator 202, to the antenna 201. This Doppler frequency is received by each ground tracking station and is utilized to derive missile velocity information.

The filter 236 presents a high mismatch to the output pulses of the pulse beacon 232 to reflect them back into the circulator in order to cause the pulse signal to be radiated from antenna 201.

Figure 3:
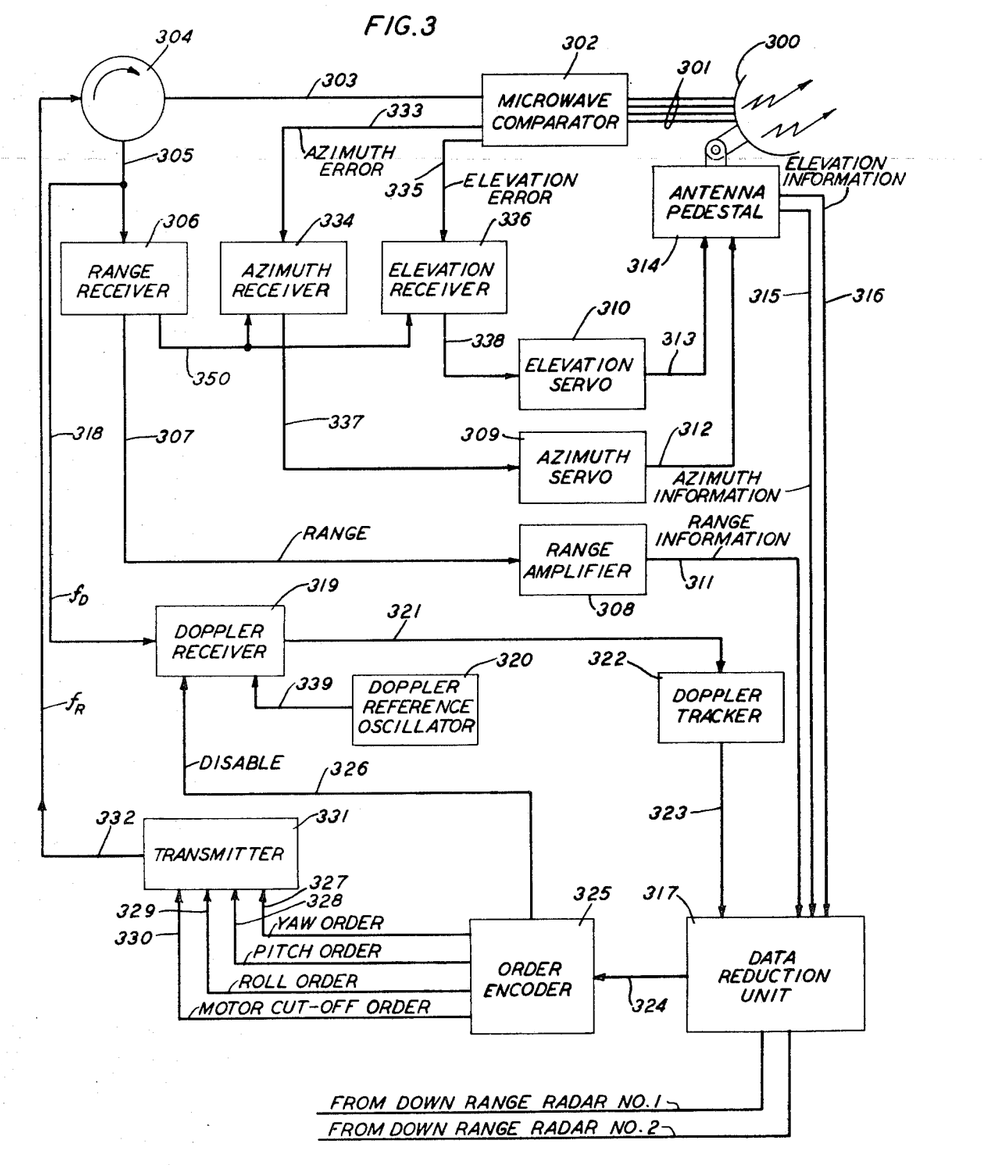
FIG. 3 discloses that portion of the guidance system which is situated at the tracking radar observation sites.

FIG. 3 discloses details of the ground-based radar equipment at the launching site. This equipment is operative to generate, at a specified repetition rate, commands which are transmitted to the missile-borne equipment. As described, the equipment in the missile responds to each command and generates a coded chain of responding pulses which are transmitted back to the tracking radar, which, in response thereto, performs the conventional monopulse radar tracking operation and, in addition, derives missile velocity and position information.

The down range radar trackers are identical to that shown on FIG. 3 except for the fact that their data reduction units 317 are somewhat simplified since they do not receive information from a plurality of trackers as does the unit at the launching site. Thus, the units 317 in these down range trackers do not have the input conductors shown connected to the bottom of unit 317 on FIG. 3 for the launching site tracker.

The tracking radar transmitter is shown as element 331 in FIG. 3. It is controlled by the order encoder 325 which causes transmitter 331 to generate commands having the proper interpulse spacing and at an appropriate repetition rate. Each command is applied over conductor 332 to microwave circulator 304, out over conductor 303 through microwave comparator 302, and over conductors 301 to the tracking radar antenna 300.

Each command transmitted from the radar antenna 300 is received by the missile which, in response thereto, generates a responding pulse series for transmission back to the tracker antenna 300. The received responding pulses are applied over conductors 301 to microwave comparator 302. Antenna 300, conductors 301 and microwave 302 function in the manner well known to supply elevation error information, azimuth error information and range information. The elevation error information is applied over conductor 335 to elevation receiver 336. The azimuth error information is applied over conductor 333 to the azimuth receiver 334, while the range information is applied over conductor 303, through microwave circulator 304, over conductor 305 to the range receiver 306. The detected and amplified azimuth and elevation error information is applied from the output of receivers 334 and 336 over conductors 337 and 338, to the azimuth and elevation servos 309 and 310, respectively, which, in response thereto, apply the necessary control signals over conductors 313 and 312 to the antenna pedestal equipment 314 to maintain accurate tracking of the missile.

Range receiver 306 detects and amplifies the range information from the microwave circulator 304 and applies the amplified range information over conductor 307 to range amplifier 308. In a conventional manner range information from range receiver 306 is also transmitted for blanking purposes over conductor 350 to the azimuth and elevation receivers 336 and 334 in order to exclude input signal noise from these receivers in the time period between the reception of pulse signals.

The antenna pedestal 314 contains the necessary angular measuring equipment which transmits over conductors 315 and 316 to the data reduction unit 317 information pertaining to the azimuth and elevation of antenna 300. The range amplifier 308 amplifies the output of range receiver 306 and applies the amplified range information over conductor 311 to data reduction unit 317.

Tracking antenna 300 also receives the output signal from the Doppler transmitter in the missile. This signal is applied over conductors 301, through microwave comparator 302, over conductor 303, through the microwave circulator 304, over conductors 305 and 318 to one input of the Doppler receiver 319. The Doppler reference oscillator 320 comprises a precision oscillator having the required frequency stability and is of the same nominal frequency as that in the missile. The output of this oscillator is applied to another input of the receiver 319 over conductor 339. Thus, receiver 319 receives the reference frequency signal from oscillator 320 as well as the Doppler signal from the missile over conductor 318. The Doppler signal from the missile is shifted in frequency from that of the reference oscillator 320 by an amount determined by the velocity of the missile. Receiver 319 amplifies the Doppler signal from the missile, amplifies the signal from the reference oscillator, heterodynes the two, and then applies the difference frequency over conductor 321 to Doppler tracker 322. The Doppler tracker 322 contains the necessary equipment for deriving missile velocity information from the difference frequency applied to its input. This derived velocity data is applied over conductor 323 to the data reduction unit 317.

The data reduction unit receives the Doppler velocity from Doppler tracker 322, receives the range information from the range amplifier 308, and receives the angular information regarding elevation and azimuth of the tracking antenna from the antenna pedestal equipment 314. Similar information is also received from down range trackers, if provided. Previous to the flight of each missile, the data reduction unit is programmed with information concerning the trajectory required for the missile to reach its target. The data reduction unit receives all this information and utilizes this information as described in greater detail hereinafter to determine whether or not the missile is on its proper course and, if it is not, to determine the steering necessary to return it to its proper course. It derives the necessary steering orders which are transmitted to the missile to return it to its proper trajectory. This steering information is applied by the data reduction unit over conductor 324 to the order encoder 325. The order encoder applies, as required, yaw, pitch, roll and motor cut-off orders over conductors 327, 328, 329, and 330, respectivey, to transmitter 331. The transmitter, in response to the receipt of this information, generates the appropriate command pulses for transmission to the missile. The order encoder also sends a blanking pulse via conductor 326 to the Doppler receiver to disable it immediately prior to and during the transmision of pulses from transmitter 331. The order encoder in generating the necessary orders for the missile generates pulse codes having the proper interpulse spacing so that both the identity of the tracker and the nature of the command are represented by the spacing between various pulses in each command as already described.

Order encoder 325 may be implemented by a variety of well known circuit configurations. As previously explained, the orders transmitted by the radar to the missile are in the form of four pulses as shown in FIG. 5. These four pulses are generated in two successive groups of two pulses per group. The interpulse spacing for each group, time $t_1$ in FIGS. 5 and 5A, is the address and identifies the radar unit which transmitted it while the time spacing between the two groups, time $t_2$ in FIG. 5A, determines the command. The Data Reduction Unit 317, a special purpose version of which is disclosed in greater detail in FIGS. 8, 9 and 10 may, alternatively, be any commercially available general purpose computer programmed to perform the operations described below. If a general purpose computer is selected, it is preferably of the digital type, for example, the IBM 709 computer, and the commands it generates from the data it receives will be in the form of binary numbers indicative of the time intervals which correspond to the several commands. Of course, the card reading and punching sections of the commercial computer are not used and the digital data are fed directly to the computer section and the processed digital data are fed directly to the order encoder 325. Encoder 325 merely receives these binary numbers from unit 317 and converts them to pairs of pulses with interpulse spacings representing the required commands. The programming of these computers to perform the functions indicated herein, as well as the details of the computer circuits, are so well known in the data processing art that their detailed description at this time would serve no useful purpose. Briefly, however, it may be suggested that the binary to time conversion is generally performed by a conventional preset binary counter driven by a clock frequency and preset by the binary computer data representing the desired time interval. Typical of such counters is that described on page 90 of Digital Counters and Computers by Ed Bukstein, Rinehart & Company, Inc., New York (1960). This results in two pulses separated by a time interval representative of the required command. The command pulses which modulate the transmitted may then be encoded from these two pulses to include the address of the transmitter by the simple well known expedient of a delay line, such as delay line 711, and an amplifier, such as amplifier 714, which were previously described in connection with the address encoder of FIG. 7. Referring momentarily to FIG. 7, it will be remembered that a pair of address pulses, separated by time $t_6$, was generated each time a pulse was received at conductor 710. Therefore, upon receipt of the two pulses from the binary counter, the amplifier will generate the complete command series such as shown in FIG. 5A. The blanking pulse for conductor 326 leading to the Doppler receiver is conventionally generated by a simple pulse stretcher which starts the pulse when the first pulse is received from conductor 324 and continues for a time greater than the longest command period. While certain specific, well known circuit means have been suggested for performing these functions, the invention is not to be considered as restricted to them as numerous equivalent means are known to those skilled in the computer and data processing arts.

One of the many functions performed by the data reduction unit 317 is the determination of the instantaneous missile velocity with a high degree of precision. This operation is performed in response to the receipt of the Doppler velocity via conductor 323 along with the receipt of range information from the range amplifier 308 via conductor 311. The data reduction unit differentiates the range information to obtain raw pulse radar velocity, smooths this velocity for 5 seconds to obtain accurate long-term radar velocity, receives the raw Doppler velocity from the Doppler tracker 322, smooths this velocity for 5 seconds to obtain long-term Doppler velocity whose main error comprises long-term Doppler oscillator drift in the missile, also smooths the raw Doppler velocity for one-half second to obtain short-term Doppler velocity whose main error comprises short-term Doppler missile oscillator drift, determines the oscillator drift at any instant of time from the difference in velocities between the long-term Doppler and long-term radar velocities, and then algebraically substracts this difference from the short-term smoothed Doppler velocity to obtain instantaneous missile velocity of great precision.

Figure 4A:
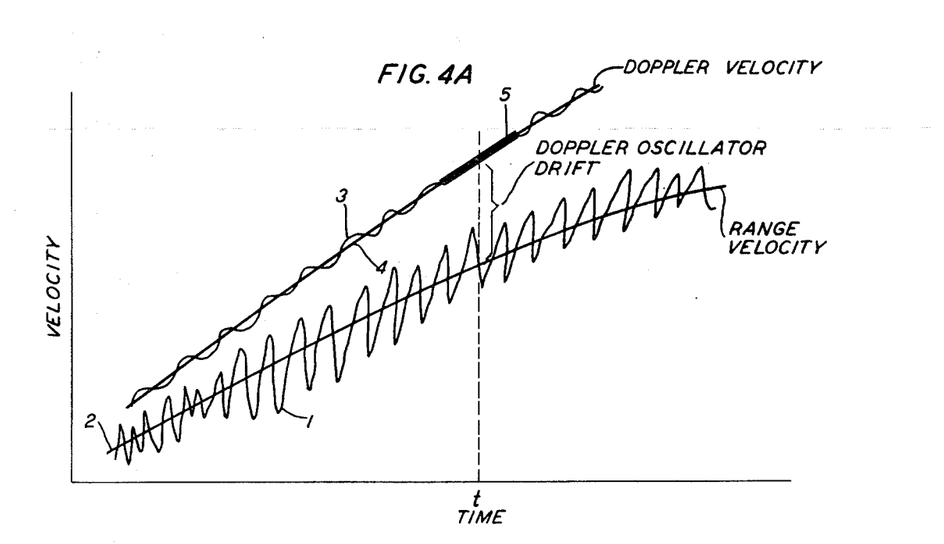
FIGS. 4A and 4B illustrate the manner in which the Doppler and pulse radar missile velocity determinations are smoothed and processed to obtain an accurate missile velocity.

The manner in which this is accomplished may best be appreciated from a consideration of FIG. 4A. Curve 1 represents the range velocity obtained by differentiating the range information supplied over conductor 311. As may be seen, this curve contains many irregularities which are caused by atmospheric noise, radar jitter and other sources of error. This velocity is then smoothed for 5 seconds to obtain the long-term radar velocity shown as 2. As may be seen, velocity 2 is quite smooth and contains no rapidly changing irregularities. This velocity is quite accurate on a long-term basis. However, by itself, it is not sufficient for providing an indication of instantaneous velocity since the 5 second smoothing effectively obliterates possible velocity variations occurring within the last few seconds of the 5 second interval. The Doppler velocity received from Doppler tracker 322 is shown as curve 3 in FIG. 4A. It also contains irregularities due to noise and other such sources of error. The data reduction unit smooths this velocity for 5 seconds and derives a long-term smoothed velocity shown as 4. The data reduction unit also smooths the raw Doppler velocity 3 for one-half second in order to obtain a short-term smoothed velocity 5.

The velocities 1, 2, 3, 4, and 5 in FIG. 4A all slant upwards to the right since the missile is increasing in velocity with respect to time. The manner in which the smoothing is used to obtain precise instantaneous missile velocity may be best understood by first considering FIG. 4B where similar range and Doppler velocities are shown for an object having a constant velocity. Curve 1 represents the instantaneous range velocity obtained by differentiating the range information. Velocity 1 is then smoothed for 5 seconds to obtain the long-term smoothed velocity 2. The raw Doppler velocity is shown as curve 3. This velocity is also smoothed for 5 seconds to obtain the velocity 4. The raw Doppler velocity 3 is also short-term smoothed for one-half second and the result is shown as 5 on FIG. 4B. It has already been stated that long-term range velocity 2, although accurate, is unsuitable by itself for providing an indication of instantaneous velocity since any variation in velocity occurring within the last few seconds is effectively removed by the 5 second smoothing process. The long-term smoothed Doppler velocity 4 is similarly unsuitable by itself. Of the two long-term smoothed velocities, the radar velocity 2 is the more accurate since the 5 second smoothing interval effectively removes all sources of error insofar as practical considerations are concerned. The long-term smoothed Doppler velocity 4 is also free of error except for Doppler oscillator drift. If this oscillator had perfect frequency stability, the long-term smoothed Doppler velocity 4 would then, of necessity, coincide with the long-term radar smoothed velocity 2 since the two represent the velocity of the same object, i.e., the missile. However, no oscillators are available having such frequency stability and therefore velocity 4 is shown displaced from that of smoothed velocity 2.

The Doppler velocity 4 is shown as essentially a straight line and parallel to the radar velocity 2. This represents the condition that the Doppler missile oscillator is not continually drifting but instead is shifted from its assigned frequency by a constant amount. If the oscillator were continuously drifting in a certain direction, line 4 would slant either up or down on FIG. 4B depending upon the direction of drift. However, in order to simplify an understandstanding of the fundamentals involved, the oscillator is assumed not to be continuously drifting but instead merely to have shifted a constant amount from its assigned frequency.

Figure 4B:
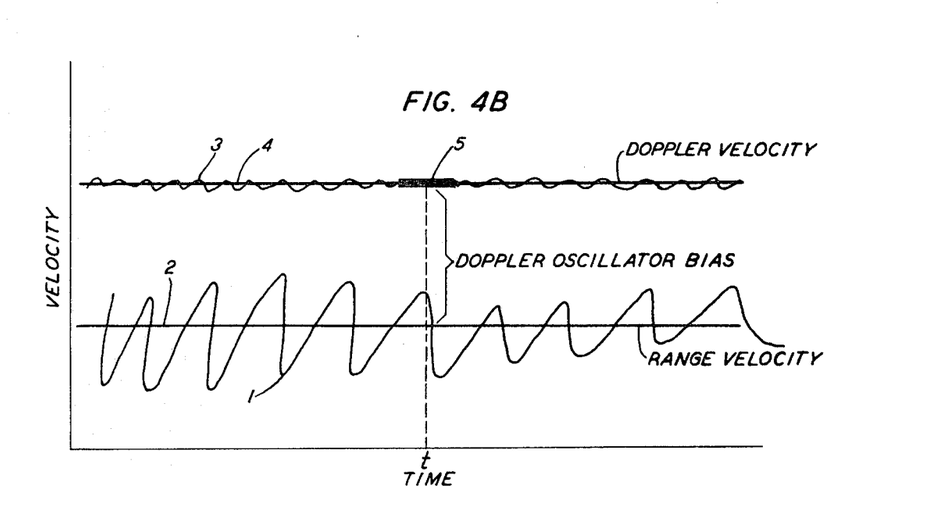

Referring now to the time $t$ shown in FIG. 4B, it may be appreciated that the distance between the smoothed radar velocity 2 and the smoothed Doppler velocity 4 is representative of the amount the Doppler oscillator has drifted from its assigned frequency insofar as long-term considerations are concerned. Also, it is known that oscillators shift their frequency at a relatively slow rate timewise and therefore it may be also said that the distance between curves 2 and 4 is representative of the Doppler drift at instantaneous time $t$. The raw Doppler velocity 3 is smoothed for one-half second to provide an instantaneous Doppler velocity whose only source of error of any significance is long-term Doppler oscillator drift. This one-half second smoothed instantaneous Doppler velocity is shown as 5 in FIG. 4B. The Doppler drift at this time may be determined by the difference between velocities 2 and 4 and therefore once the instantaneous Doppler drift is known the desired instantaneous velocity may be determined by algebraically subtracting the instantaneous Doppler oscillator drift from the short-term velocity 5. Once this is done, an accurate instantaneous velocity of extreme precision is obtained.

Referring now to FIG. 4A, it may now be appreciated that the distance between curves 2 and 4 represents the Doppler oscillator drift at time $t$. The drift at this time may also be used as an indication of instantaneous drift since it is well known that properly designed oscillators shift their frequency at a relatively slow rate insofar as present considerations are concerned. The instantaneous missile velocity may now be obtained by subtracting the Doppler oscillator drift at time $t$ in FIG. 4A from the short-term smoothed Doppler velocity 5 in order to obtain the desired instantaneous missile velocity with great accuracy.

Figure 8:
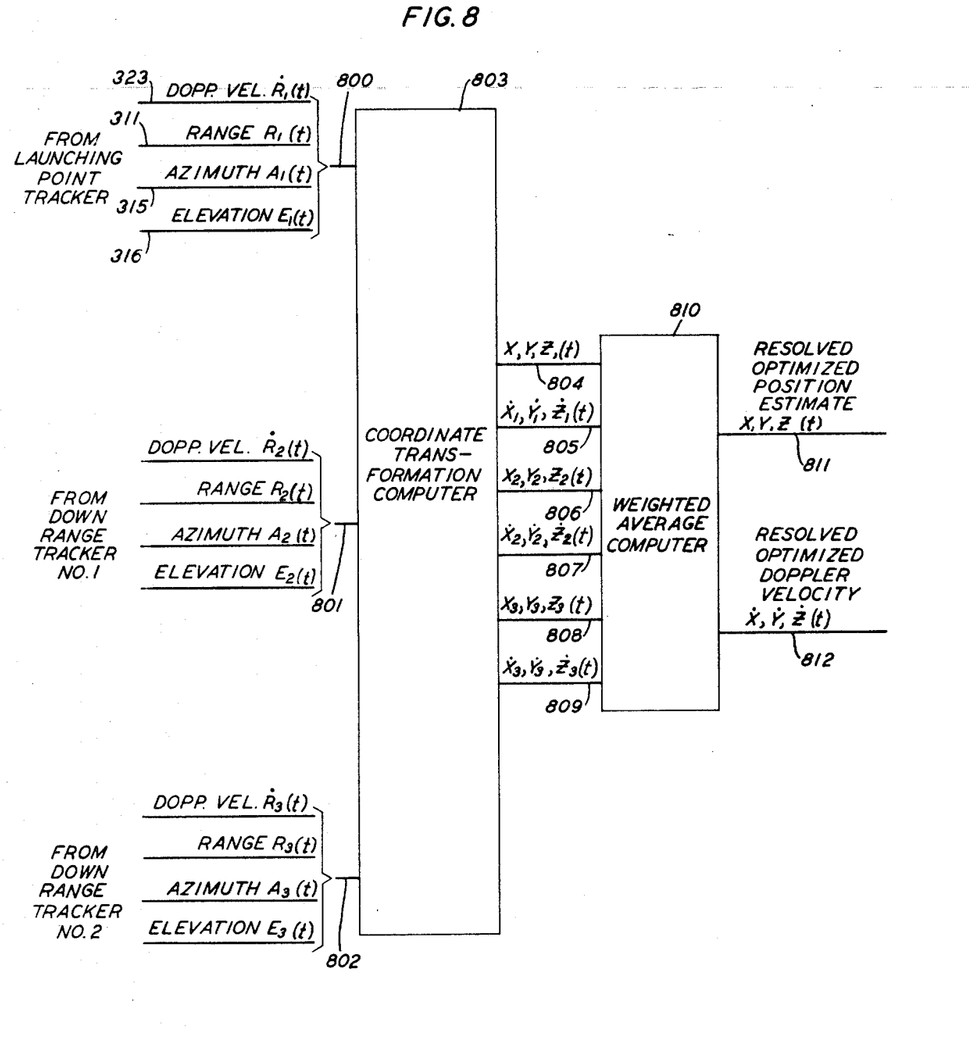
FIGS. 8, 9 and 10 together disclose the details of the data reduction unit 317 in FIG. 3.
Figure 9:
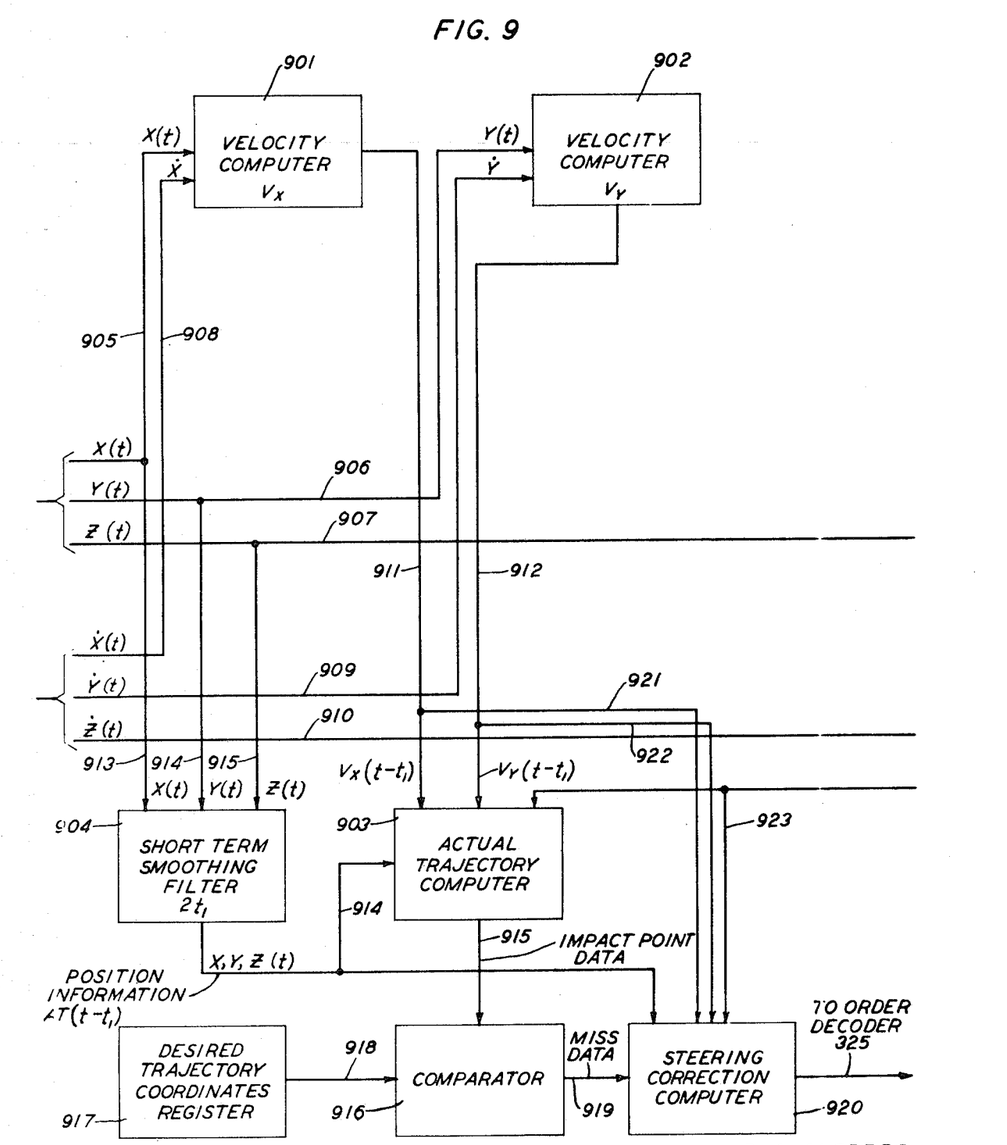
Figure 10:
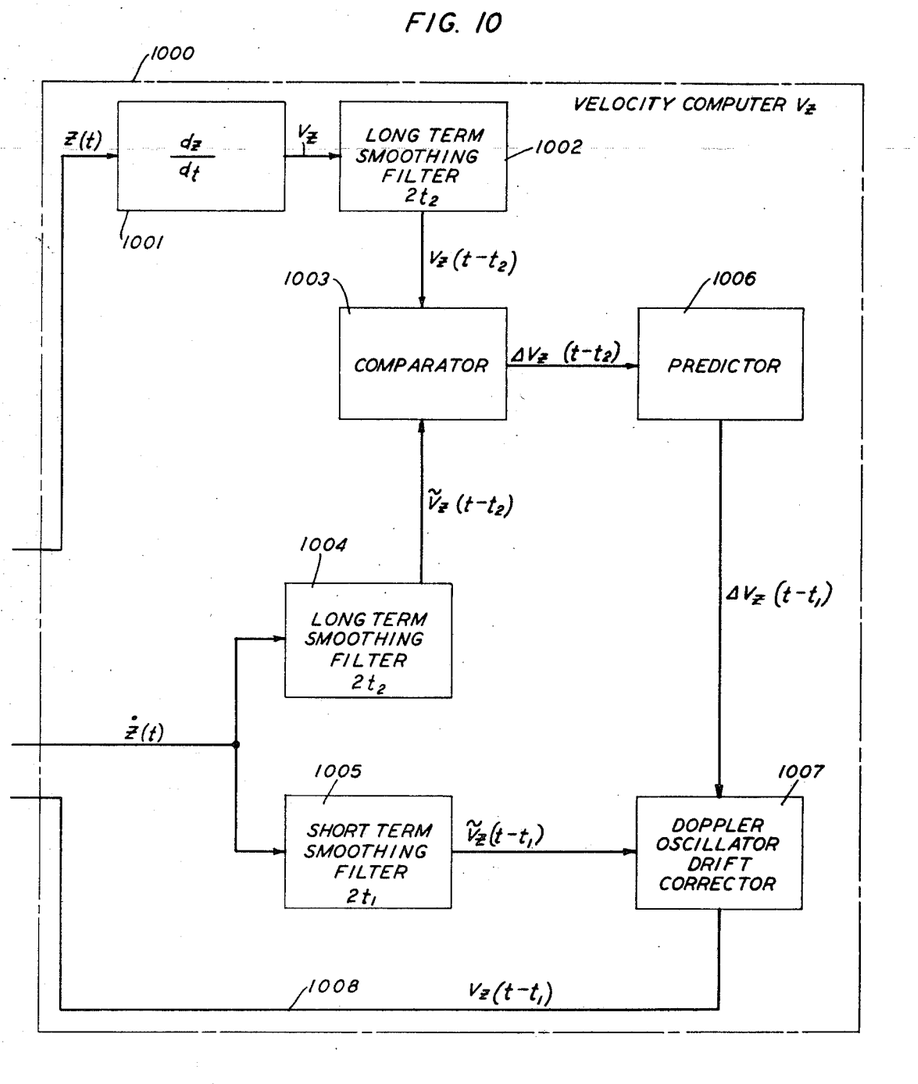
Figure 11:
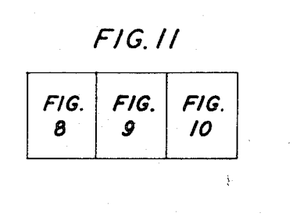
FIG. 11 shows how FIGS. 8–10 should be arranged with respect to each other.

The details of the data reduction unit for the launching site tracker element 317 on FIG. 3 are disclosed on FIGS. 8, 9, and 10 of the drawings. The input information supplied to the data reduction unit is received over data paths 800, 801, and 802, each of which may comprise a common ground (not shown) and four individual conductors designated $\dot{R}_1(t)$, $R_1(t)$, $A_1(t)$ and $E_1(t)$. The information from the radar tracker situated at the blast-off point is received over conductor group 800 while the information from the down range radars is received over conductor groups 801 and 802.

Referring to conductor group 800, the conductor designated $\dot{R}_1(t)$ receives the Doppler velocity from the Doppler tracker 322. Conductor $R_1(t)$ receives the instantaneous range information from the range amplifier 308. Conductors $A_1(t)$ and $E_1(t)$ receive the azimuth and elevation information respectively. The $(t)$ portion of the designation of each of these conductors indicates that the information is constantly changing with time as the missile proceeds in its flight.

Similar information from the down range radar trackers is received over conductor groups 801 and 802.

Thus, the data reduction unit receives the Doppler velocity, the range, as well as the azimuth and elevation of the missile from each of the thre radar trackers. This information is based on a coordinate system commonly used in connection with geographical measurements wherein the direction North is the reference point for azimuth measurements and wherein the surface of the earth is used as the reference point for elevation measurements. Although measurements based on such a coordinate system are adequate for certain types of computations, i.e., surveying, etc., they leave much to be desired when it comes to computing trajectory information for long-range missiles. Those working in the missile field have found from experience that the computation problems are greatly reduced if coordinates other than the well-known aforementioned azimuth and elevation reference points are utilized. Although any number of alternative coordinate systems may be used, experience has shown that one of the most useful coordinate systems comprises one having three reference coordinates at right angles with respect to one another taken at the power cut-off point of the missile. These three coordinates may be generally designated as X, Y and Z, respectively, as shown in FIG. 1.

Accordingly, the information received from the three radar trackers over conductor groups 800, 801, and 802 is fed to coordinate transformation computer 803 which translates the received input information into the desired X, Y, and Z coordinates. The output of the coordinate transformation computer is supplied over conductor groups 804–809, each of which may comprise a common ground and three wires over which information is supplied in the desired X, Y, and Z coordinates. Specifically, conductor group 804 may comprise a common ground and three wires over which information from the launching point tracker representing the current position of the missile in terms of the X, Y, and Z coordinates is supplied. Conductor group 805 supplies the Doppler velocity information from the launching point tracker. These are designated as $\dot{X}_1$, $\dot{Y}_1$, and $\dot{Z}_1$, where the dot above the letter designation represents its first derivative with respect to time. Thus, $\dot{X}_1$ represents the velocity in the $X_1$ coordinate. Similarly, conductor groups 806 and 807 supply the position and Doppler velocity in terms of the X, Y, and Z coordinates from the first down range tracker. Similar information from the second down range tracker is supplied over conductor groups 808 and 809.

The information received over conductor groups 804–809 is applied to the weighted average computer 810. The purpose of the computer is to receive the aforementioned information from all trackers simultaneously, weight the received information from each tracker in accordance with the distance between it and the missile, and in response thereto derive output information regarding the missile which represents a more accurate estimate of the missile's current position and velocity than could be supplied by any single tracker. For example, it will be appreciated that in the first few seconds following blast-off, the information from the tracking radar at the launch point is far more accurate than that from the down range trackers since the missile is then relatively close to the blast-off point and at a great distance from the down range trackers. Also, the information supplied by the down range trackers is less desirable at blast-off time since it is then based partly on the measurement of angular differences which are extremely small and difficult to measure. The same is not true for the tracker at the blast-off point since at this time the range and crosswise position changes are manifested by angular differences which are easy to measure. As the missile proceeds in its flight to the point where it is approximately equidistant from all three trackers, the validity of the information supplied from each becomes of essentially the same accuracy. Continuing, at the time of power cut-off when the missile is relatively close to the down range trackers and relatively distant from the launching point tracker, certain of the information supplied by the launching point tracker is then based on the measurement of extremely small angular differences while the same information from the down range trackers is based on the measurement of range rather than angle differences. The weighted average computer takes all this into account in its weighting operation and, as a result, produces output information that is far more accurate than that which can be supplied by any single tracker. For example, the X coordinate position data are received from all three radars and is denoted $X_1(t)$, $X_2(t)$, and $X_3(t)$, respectively. The arithmetic unit in the computer separately multiplies each of these quantities by a weighting factor, the magnitude of which was previously programmed into the computer as a function of missile distance from the radar that obtained the data. It then adds these products together and divides by the sum of the weighting factors, thus obtaining the weighted average of the X position component in accordance with elementary arithmetic operations. Computer 810 is part of the Data Reduction Unit 317 previously described and, if desired, may be any conventional general purpose computer which, as is well known, can be programmed to perform these simple arithmetic operations.

The instantaneous missile position output information from the weighted average computer 810 is supplied in terms of the X, Y, and Z coordinates over conductor group 811 which may comprise a common ground and three conductors. The Doppler velocity output of the weighted average computer is supplied in terms of the X, Y and Z coordinates over conductor group 812 which similarly may comprise a common ground and three conductors.

The position and Doppler velocity information of the missile in terms of the X coordinate are supplied over conductors 905 and 908 to the velocity computer 901 which, in the manner described hereinafter, computes a more accurate missile velocity in terms of the X coordinate. Similarly, the position and Doppler velocity information of the Y coordinate is supplied over conductors 906 and 909 to the velocity computer 902 which computes the Y coordinate portion of the more accurate missile velocity. Also, the position and Doppler velocity information in terms of the Z coordinate is supplied over conductors 907 and 910 to the velocity computer for the Z coordinate as shown in detail on FIG. 10. Velocity computers 901 and 902 as well as the one shown on FIG. 10 are identical and each computes a resultant velocity for the missile in terms of its indicated coordinate and supplies it to the Actual Trajectory Computer 903. The manner in which the three velocity computers 901, 902, and 1000 operate may be best understood from an analysis of computer 1000 shown in FIG. 10.

The missile position information in terms of the Z coordinate is supplied over conductor 907 to differentiator 1001. This circuit differentiates the Z position information to obtain a resultant velocity $V_z$ which is applied to long-term smoothing filter 1002 which has an effective length of time $2t_2$. Thus, if it is desired to filter the velocity supplied by differentiator 1001 for 5 seconds, $t_2$ will represent a time of 2½ seconds and $2t_2$ will represent 5 seconds.

The velocity information from differentiator 1001 is not used in its raw state since it comprises many sources of error, such at atmospheric noise, radar pulse jitter, etc. The output of filter 1002 is applied to comparator 1103. This output information is designated $V_z(t-t_2)$ and represents the smoothed pulse radar velocity for the Z coordinate $t_2$ seconds before the time $t$ indicated on FIG. 4a. It is quite accurate on a long-term basis since the long-term smoothing effectively removes all source of error. However, the average age of the output information in the filter is $t_2$ or 2½ seconds and thus cannot be used by itself to provide instantaneous velocity information since any velocity changes occurring in the last few tenths of a second are effectively obliterated by the long-term smoothing.

The Doppler velocity for the Z coordinate is supplied over conductor 910 to Long-Term Smoothing Filter 1004 of length $2t_2$ and to Short-Term Smoothing Filter 1005 of length $2t_1$. The long-term filter 1004 performs the same operation on the raw Doppler velocity as filter 1002 does for the raw radar velocity. The output of filter 1004 is also applied to the comparator 1003.

From the preceding discussion in connection with FIG. 4 it may be appreciated that the Doppler velocity from filter 1004 is quite accurate except for possible draft in the Doppler oscillators. Other than this drift, the output information from filters 1002 and 1004 must of necessity be identical since they represent identical information, i.e., the velocity of the tracked missile. As a consequence, any difference between the velocity from filter 1002 and that from filter 1004 must represent the relative frequency drift of the two Doppler oscillators. Comparator 1003 receives the output from filters 1002 and 1004 and supplies the resultant velocity difference to Predictor 1006. The function of the Predictor 1006 is to receive the detected difference in velocities and by differentiation, ascertain the rate at which the Doppler oscillators are drifting and, from the differentiation operation update the detected velocity difference from its average age of 2½ seconds to a time which more nearly represents the Doppler oscillator drift at a very short increment of time $t_1$ prior to the instant $t$ indicated in FIG. 4a where $t_1$ is the average age of information in filter 1005 as explained hereinafter.

The Doppler velocity in terms of the Z coordinate is also applied from conductor 910 to Short-Term Smoothing Filter 1005 having an effective length of $2t_1$. The purpose of this filter is to short-term smooth the raw Doppler information for a time sufficient to reduce some errors but yet for a time which still permits any recent variations in velocities to be detected. Thus, in accordance with present day practice, filter 1005 could have an effective length of .5 second and therefore $t_1$ would be equal to .25 second.

The output of the filter 1005 is supplied to the Doppler oscillator drift corrector 1007. The function of this circuit is to receive the apparent Doppler velocity of the missile in terms of information one-quarter of a second old from filter 1005, receive the Doppler oscillator drift information from Predictor 1006 in terms of information also one-quarter of a second old (since $t_1$ is equal to one-quarter of a second) and subtract this Doppler drift information, $\Delta V_z(t-t_1)$, from the instantaneous short-term Doppler velocity $\tilde{V}_z(t-t_1)$, to obtain a resultant Doppler velocity of extreme accuracy as already described in connection with FIG. 4. This resultant velocity is designated $V_2(t-t_1)$ where $t_1$ is .25 second and, thus, the output of the corrector 1007 represents an accurate estimate of the missile velocity as of the present time minus one-quarter of a second.

The output of corrector 1007 is supplied over conductor 1008 to the Actual Trajectory Computer 903. This computer also receives similar information over conductors 911 and 912 from Velocity Computers 901 and 902 representing the X and Y coordinates respectively of the missile velocity. The X, Y, and Z coordinates of the missile position information from the conductor group 811 are supplied over conductors 913, 914, and 915 to a short-term smoothing filter 904 having an effective length of $2t_1$ where $t_1$ may once again be equal to .25 second. The output of this filter represents a short-term smoothing of the instantaneous missile position and is supplied over conductor group 914 to the Actual Trajectory Computer 903. Conductor group 914 is shown as a single conductor for purposes of simplicity but in practice may represent a common ground and three conductors which together would transmit the output information of filter 904 in terms of the X, Y, and Z coordinates.

Thus, the Actual Trajectory Computer 903 receives the short-termed smoothed radar position information from filter 904 and receives the velocity information from computers 901, 902, and 1000. In response to the receipt of this information, computer 903 updates the velocity information and determines what the resultant impact point of the missile would be if the rocket power should be cut off at the current time. This impact point data is transmitted over conductor 915 to comparator 916. Comparator 916 is any conventional digital computer capable of subtracting one digital number from another. As such devices are so well known and the elementary subtraction operation is so commonly performed by their arithmetic units, no further description thereof is necessary to a complete understanding of the invention by those skilled in this art. Comparator 916 also receives information regarding the coordinates of the intended target as well as the trajectory necessary for the missile to reach the target. This information is received from the Desired Trajectory Coordinate Register 917 over conductor 918. Comparator 916 compares the two sets of data and subtracts one set from the other to derive what may be called "miss data." This data will include such various factors as the amount the missile should change its velocity in order to hit the intended target, as well as any steering corrections that should be made. This information is transmitted over conductor 919 to the steering correction computer 920. This computer receives the "miss data" and additionally receives information over conductors 921, 922 and 923 regarding the present velocity of the missile as well as position information from the short term smoothing filter 904. The computer 920 operates in response to the receipt of this information to derive the necessary steering orders that should be transmitted to the missile in order to correct any detected deviations from the desired trajectory. The output information of the computer is applied over conductor 324 to the order encoder 325 on FIG. 3. The order encoder responds to this information and, in turn, modulates the radar transmitter 331 with the necessary orders to effect the desired trajectory corrections.

The data reduction unit 317 in each down-range tracker can be simplified somewhat over that shown on FIGS. 8-10 for the launching site tracker. Specifically, each down-range tracker does not receive data from the other trackers as does the tracker at the launching site. Therefore, the data reduction unit 317 in each down-range tracker does not require the weighted average computer 810, the coordinate transformation computer 803 need only have one set of input conductors, and the output of this computer may be fed directly to conductors 811 and 812 since the weighted averaging operation is not required.

It is to be understood that the above-described arrangements are but illustrative of the application of the principles of the invention. Numerous other arrangements may be devised by those skilled in the art without departing from the spirit and scope of the invention. For example, none of the trackers need be located at the launching site and the central location which receives data from all trackers need not be near any of them.

What is claimed is:

1. In a guidance system having a tracking station for determining the velocity of an airborne missile, a tracking radar at said station for transmitting signals to said missile, means in said missile responsive to each of said signals for transmitting a responding signal to said tracking radar, means including said tracking radar responsive to each received responding signal for deriving data representing the instantaneous range of said missile, means for differentiating said range data to obtain radar missile velocity data, a Doppler transmitter including an oscillator in said missile, means at said tracking radar responsive to signals received from said Doppler transmitter for deriving Doppler missile velocity data, means smoothing both said radar and said Doppler missile velocity data during substantially equal predetermined periods of time, means deriving the difference between the smoothed radar and Doppler velocity data to obtain error velocity data representative of the frequency drift of said Doppler oscillator, another smoothing means having an effective smoothing period substantially shorter than the aforesaid predetermined periods to obtain short term smoothed Doppler missile velocity data from said Doppler missile velocity data, and means combining said error velocity data and said short term smooth Doppler velocity data to obtain a more precise missile velocity.

2. In a missile guidance system having a tracking station, a tracking radar at said station for transmitting signals to said missile, means in said missile responsive to each of said signals for transmitting a responding signal to said tracking radar, means including said tracking radar responsive to each received responding signal for deriving the instantaneous range of said missile, means for differentiating said range data to obtain a radar missile velocity, a Doppler transmitter in said missile, means at said tracking radar responsive to signals received from said Doppler transmitter for deriving a Doppler missile velocity, means for long-term smoothing said Doppler and radar velocities, means for short-term smoothing said Doppler velocity, and means for algebraically subtracting from said short-term smoothed Doppler velocity the difference between said long-term smoothed velocities to obtain a more precise missile velocity.

3. In a missile guidance system having a tracking station, a tracking radar at said station for transmitting signals to said missile, means in said missile responsive to each of said signals for transmitting a responding signal to said tracking radar, means including said tracking radar responsive to each received responding signal for deriving the instantaneous range of said missile, means for differentiating said range data to obtain a radar missile velocity, a Doppler transmitter including an oscillator in said missile, means at said tracking radar responsive to signals received from said Doppler transmitter for deriving a Doppler missile velocity, means for long-term smoothing said Doppler and radar velocities, means for short-term smoothing said Doppler velocity, means for determining the drift of said Doppler oscillator from the difference between said long-term smoothed velocities, and means responsive to the determination of said drift for determining the true missile velocity from said short-term smoothed missile velocity.

4. In a missile guidance system having a tracking station, a tracking radar at said station for transmitting signals to said missile, means in said missile responsive to each of said signal for transmitting a responding signal to said tracking radar, means including said tracking radar responsive to each received responding signal for deriving the instantaneous range of said missile, means for differentiating said range data to obtain a radar missile velocity, a Doppler transmitter including an oscillator in said missile, means at said tracking radar responsive to signals received from said Doppler transmitter for deriving a Doppler missile velocity, means for long-term smoothing said Doppler and radar velocities, means for determining the difference between said long-term smoothed velocities, means for converting said difference to an error velocity resulting from frequency drift in said Doppler oscillator, means for short-term smoothing said Doppler velocity, and means for algebraically substracting said error velocity from said short-term smoothed Doppler velocity to obtain the true missile velocity.

5. In a guidance system having a plurality of stations for simultaneously tracking the flight of an airborne missile, means at each station responsive to the tracking of a missile for deriving its instantaneous velocity and position data, means at each station location for comparing said velocity and position data with a precomputed trajectory for said missile to ascertain any trajectory errors, means responsive to said ascertained errors to cause all of said stations to transmit steering orders to said missile to return it to its proper trajectory, means in said missile to identify the stations transmitting the steering orders and to conduct them into separate channels corresponding to the several stations, a command channel selector to receive the steering orders from said separate channels, said selector having a preference gating means which arranges said channels in a predetermined preference order so that orders are transmitted through said channel selector from only that one channel having the highest preference out of all channels currently receiving orders.

6. In a missile guidance system, means for simultaneously receiving guidance orders from a plurality of tracking stations, means selectively passing orders from only one station at a time in a predetermined preference order, said means including means responsive to the cessation of orders received from any station of higher preference to cause the passage of orders from the station of next lower preference then transmitting orders.

7. A missile guidance system comprising, means for receiving orders from a plurality of tracking stations, means for arranging said stations in a stated order of preference, means for identifying the station transmitting each received order, and means permitting the missile guidance system to respond only to the received orders from the station having the highest preference out of all stations currently transmitting orders.

References Cited

UNITED STATES PATENTS 2,743,437   4/1956   Davenport _____________ 343—8

RODNEY D. BENNETT, Primary Examiner

M. F. HUBLER, Assistant Examiner

U.S. Cl. X.R.

244—3.14; 343—6, 8, 9